US009558181B2

(12) United States Patent
Cecchi et al.

(10) Patent No.: US 9,558,181 B2
(45) Date of Patent: Jan. 31, 2017

(54) FACILITATING A MEETING USING GRAPHICAL TEXT ANALYSIS

(71) Applicant: International Business Machines Corporation, Armonk, NY (US)

(72) Inventors: Guillermo A. Cecchi, New York, NY (US); James R. Kozloski, New Fairfield, CT (US); Clifford A. Pickover, Yorktown Heights, NY (US); Irina Rish, Rye Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/742,890

(22) Filed: Jun. 18, 2015

(65) Prior Publication Data

US 2016/0124908 A1 May 5, 2016

Related U.S. Application Data

(63) Continuation of application No. 14/530,985, filed on Nov. 3, 2014.

(51) Int. Cl.
*G10L 15/26* (2006.01)
*G06F 17/27* (2006.01)
*G06F 17/30* (2006.01)

(52) U.S. Cl.
CPC ..... *G06F 17/2785* (2013.01); *G06F 17/30705* (2013.01)

(58) Field of Classification Search
CPC ......... G06F 21/316; G10L 15/26; G10L 25/63
USPC .......................................................... 704/235
See application file for complete search history.

(56) References Cited

U.S. PATENT DOCUMENTS

| | | | | |
|---|---|---|---|---|
| 6,327,567 | B1 * | 12/2001 | Willehadson | H04M 3/56 704/231 |
| 7,507,091 | B1 * | 3/2009 | Aleali | G09B 7/00 434/236 |
| 2008/0244419 | A1 * | 10/2008 | Kurpick | G06Q 10/00 715/756 |
| 2008/0260131 | A1 * | 10/2008 | Akesson | H04M 3/56 379/202.01 |

(Continued)

OTHER PUBLICATIONS

Guillermo A. Cecchi, et al., "Facilitating a Meeting Using Graphical Text Analysis," U.S. Appl. No. 14/530,985, filed Nov. 3, 2014.

(Continued)

*Primary Examiner* — Jakieda Jackson
(74) *Attorney, Agent, or Firm* — Cantor Colburn LLP; Kevin Jordan

(57) ABSTRACT

Embodiments relate to facilitating a meeting. A method for facilitating a meeting of a group of participants is provided. The method generates a graph of words from speeches of the participants as the words are received from the participants. The method partitions the group of participants into a plurality of subgroups of participants. The method performs a graphical text analysis on the graph to identify a cognitive state for each participant and a cognitive state for each subgroup of participants. The method informs at least one of the participants about the identified cognitive state of a participant or a subgroup of participants.

10 Claims, 6 Drawing Sheets

(56) References Cited

U.S. PATENT DOCUMENTS

| | | | | |
|---|---|---|---|---|
| 2010/0037151 A1* | 2/2010 | Ackerman | ............. | G06Q 10/10 715/753 |
| 2010/0291528 A1* | 11/2010 | Huerta | ..................... | G09B 7/00 434/362 |
| 2011/0029893 A1* | 2/2011 | Roberts | ................... | G06Q 10/10 715/753 |
| 2011/0295392 A1* | 12/2011 | Cunnington | ........... | G06Q 10/10 700/90 |
| 2015/0012844 A1* | 1/2015 | Paulik | ................. | H04L 65/1096 715/753 |
| 2015/0332672 A1* | 11/2015 | Akbacak | ................. | G10L 15/18 704/257 |
| 2016/0098393 A1* | 4/2016 | Hebert | ..................... | G06F 17/28 704/9 |
| 2016/0117624 A1* | 4/2016 | Flores | ............. | G06Q 10/06393 705/7.39 |

OTHER PUBLICATIONS

List of IBM Patents or Patent Applications Treated as Related; Jun. 18, 2015, pp. 1-2.

* cited by examiner

FACILITATING A MEETING USING GRAPHICAL TEXT ANALYSIS

DOMESTIC PRIORITY

This application is a continuation of U.S. patent application Ser. No. 14/530,985, filed Nov. 3, 2014, the disclosure of which is incorporated by reference herein in its entirety.

BACKGROUND

The present invention relates generally to facilitating a meeting, and more specifically, to facilitating a meeting based on a graphical text analysis of the speeches by the meeting participants.

In a meeting, the participants may go through different states of mind or cognitive states depending on the course of the conversation that takes place among the participants. These cognitive states may include interests, current knowledge, goals, desires, emotional states (e.g., anger, frustration, irritation, happiness, satisfaction, etc.), to name a few. These cognitive states may be revealed implicitly or explicitly through the words that the participants speak during the meeting. For instance, in a classroom setting, the words that a student utters may show cognitive development of the student in the context of the lesson that a teacher is presenting.

SUMMARY

Embodiments include a computer program product, a method, and a system for facilitating a meeting. According to an embodiment of the present invention, a computer program product is provided. The computer program product comprises a computer readable storage medium having program instructions embodied therewith. The program instructions readable by a processing circuit cause the processing circuit to perform a method of facilitating a meeting of a group of participants. The method generates a graph of words from speeches of the participants as the words are received from the participants. The method partitions the group of participants into a plurality of subgroups of participants. The method performs a graphical text analysis on the graph to identify a cognitive state for each participant and a cognitive state for each subgroup of participants. The method informs at least one of the participants about the identified cognitive state of a participant or a subgroup of participants.

According to another embodiment of the present invention, a method for facilitating a meeting of a group of participants is provided. The method generates a graph of words from speeches of the participants as the words are received from the participants. The method partitions the group of participants into a plurality of subgroups of participants. The method performs a graphical text analysis on the graph to identify a cognitive state for each participant and a cognitive state for each subgroup of participants. The method informs at least one of the participants about the identified cognitive state of a participant or a subgroup of participants.

According to a further embodiment of the present invention, a computer system for facilitating a meeting of a group of participants is provided. The computer system comprises a memory having computer readable instructions and a processor configured to execute the computer readable instructions. The instructions comprise generating a graph of words from speeches of the participants as the words are received from the participants. The instructions further comprise partitioning the group of participants into a plurality of subgroups of participants. The instructions further comprise performing a graphical text analysis on the graph to identify a cognitive state for each participant and a cognitive state for each subgroup of participants. The instructions further comprise informing at least one of the participants about the identified cognitive state of a participant or a subgroup of participants.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
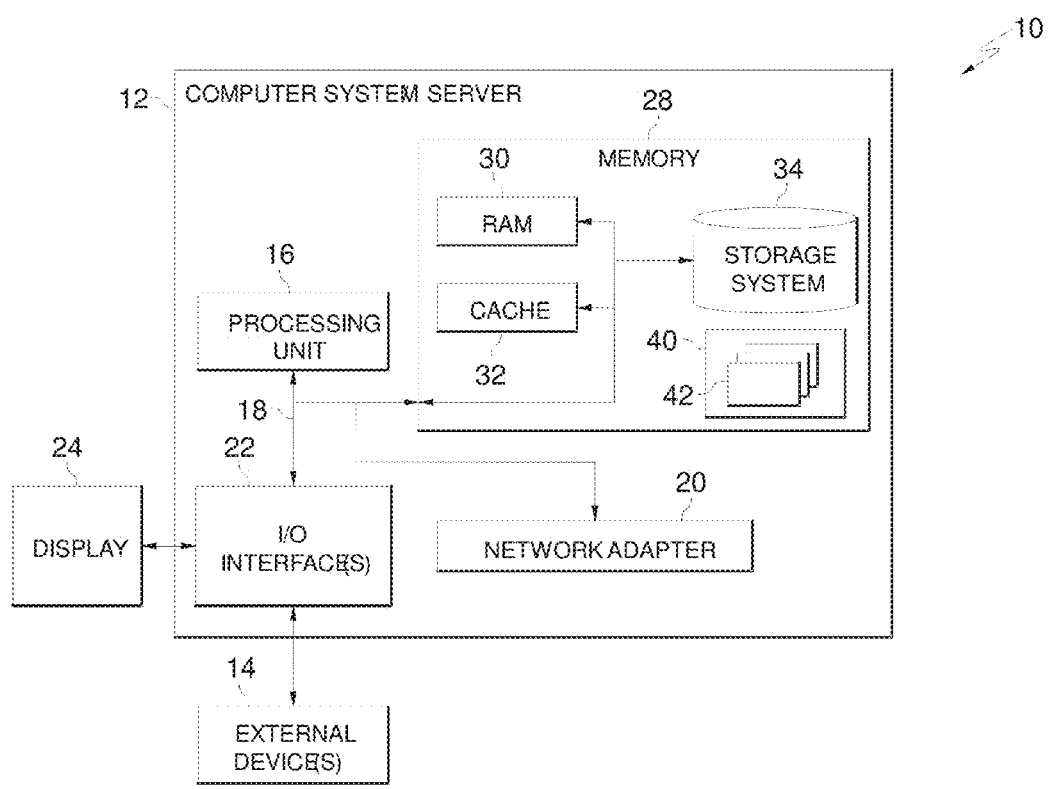
FIG. 1 depicts a cloud computing node according to an embodiment of the present invention.

In some embodiments of the invention, the systems and methods perform a graphical text analysis on the speeches of a group of participants in a meeting to identify the cognitive states of the participants and to identify transitions between different cognitive states of the participants during the meeting in real time. More specifically, the systems and methods partition the group into a plurality of subgroups of participants. The systems and methods then perform the graphical text analysis on the speeches of each subgroup so as to identify meeting dynamics between different subgroups based on the cognitive states and the transitions between the cognitive states for the subgroups. In some embodiments, the systems and methods generate an advice based on the meeting dynamics and present the advice to the participants of the meeting so as to influence the course of the meeting.

A meeting, as used in this disclosure, refers to a conversation carried out by two or more participants. A meeting may take place face-to-face—all participants are gathered at the same physical location and talk to each other, with the aid of microphones and speakers if necessary. In some cases, a meeting may take place remotely over a network when some or all participants in a meeting are remotely located from each other. That is, the participants carry on a conversation through a network by exchanging audiovisual and/or textual information using video/audio teleconference facilities or text messaging systems. Moreover, the meeting participants in a meeting have a variety of different relationships. For instance, one of the participants may be a teacher and the rest may be the students, or some of the participants may be managers and the rest are the subordinates.

A meeting participant may seek information, help, guidance, instructions, etc. in a meeting. The participant may seek knowledge but also desire to express an opinion, provide feedback, and/or receive a response with a certain degree of empathy, understanding, speed, terseness, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
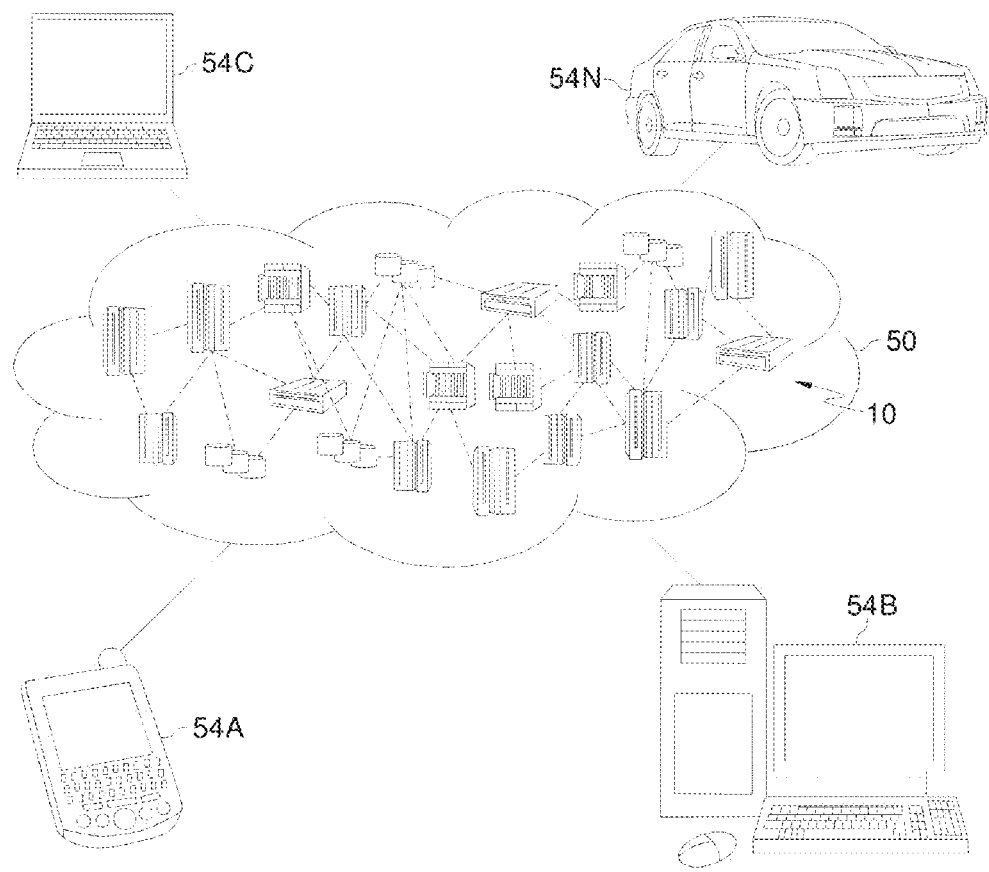
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
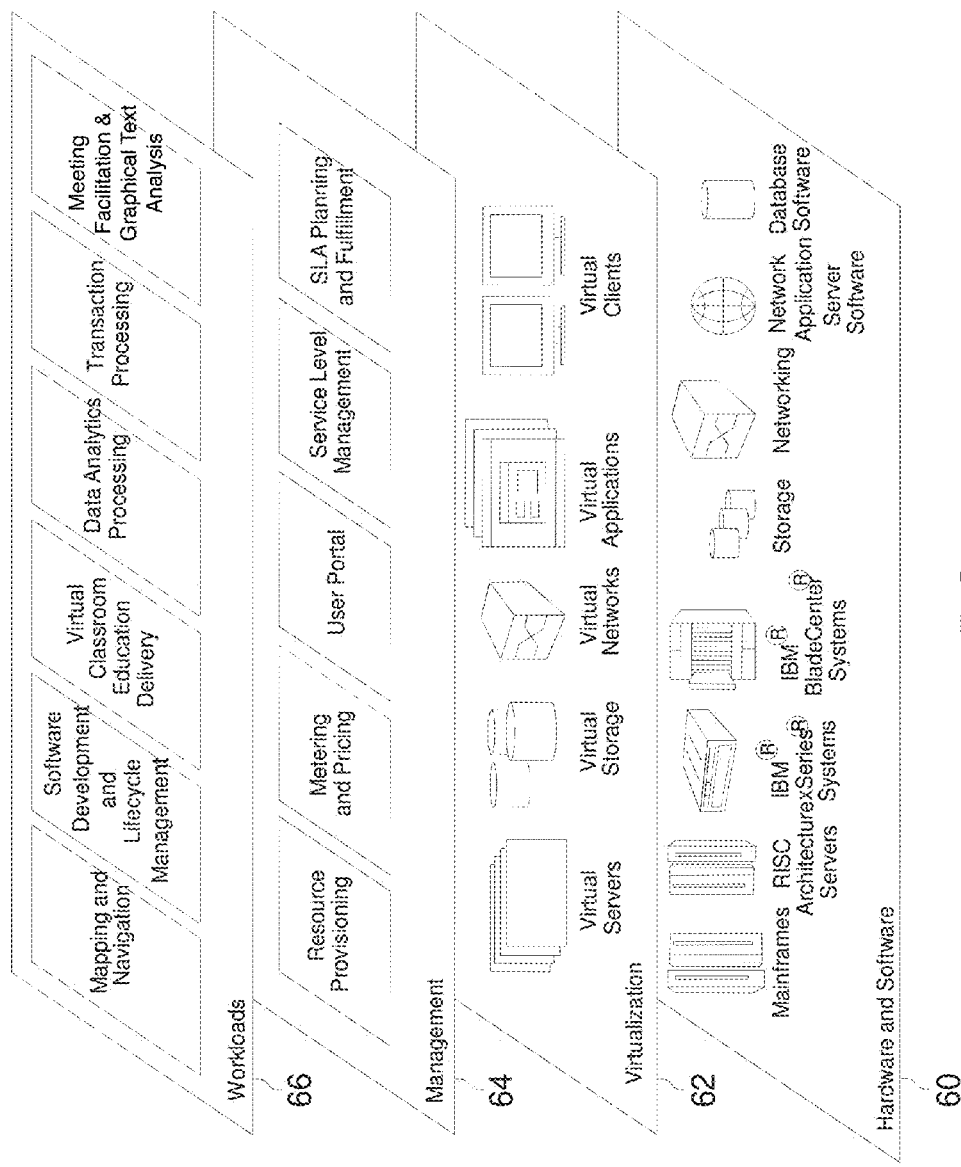
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and meeting facilitation and graphical text analysis.

Figure 4:
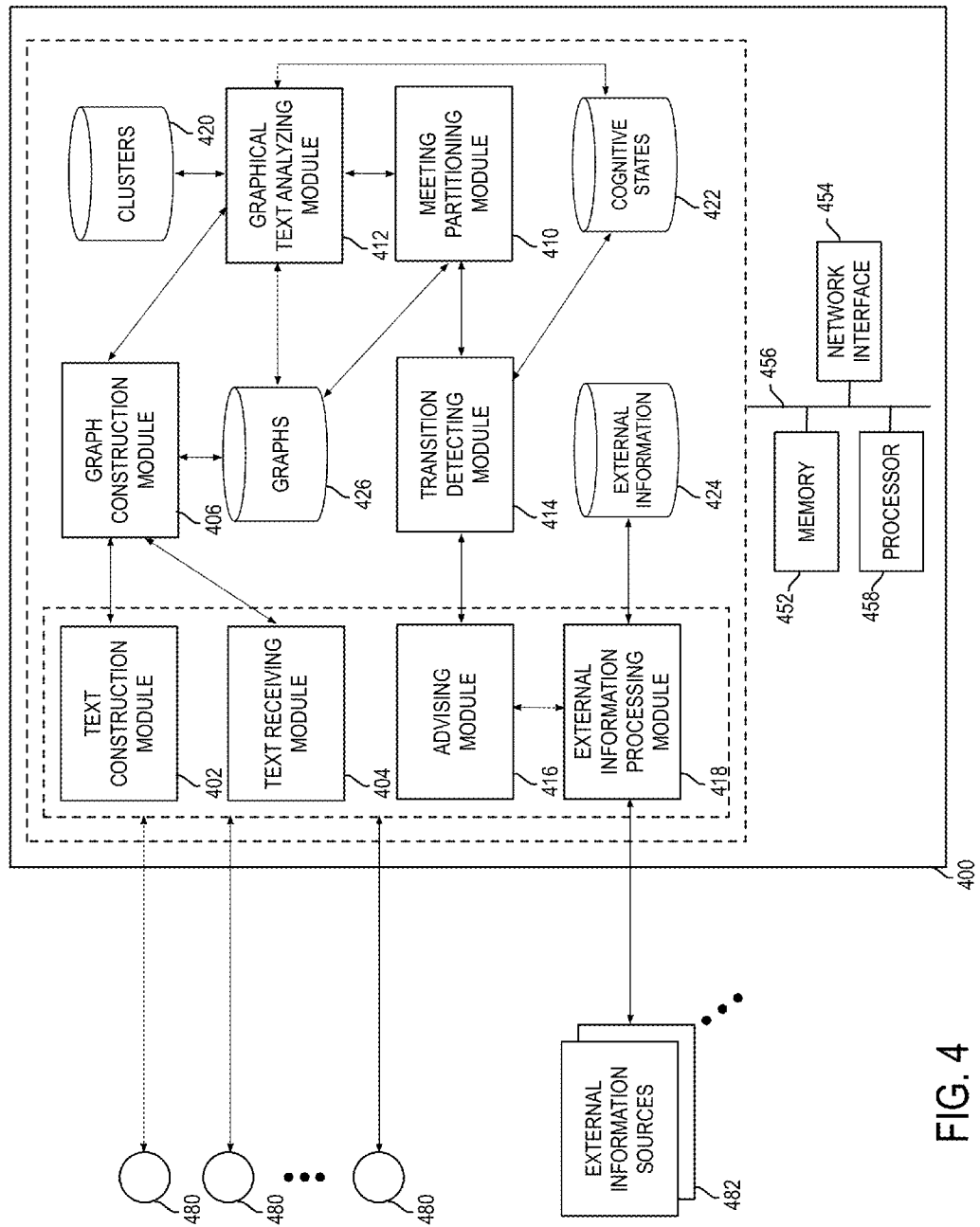
FIG. 4 depicts a system for facilitating a meeting according to an embodiment of the invention.

FIG. 4 illustrates a system 400 for facilitating a meeting. In some embodiments, the system 400 includes modules, sub-modules and datastores such as a text generation module 402, a text receiving module 404, a graph constructing module 406, a meeting partitioning module 410, a graphical text analyzing module 412, a transition detecting module 414, an advising module 416, an external information processing module 418, a clusters repository 420, a graphs repository 422, a cognitive states repository 424, and an external information repository 426. FIG. 4 also illustrates participants 480 and other external information sources 482.

The text generation module 402 transcribes the speeches into text. Specifically, the text generation module 402 converts the audio signals of the speeches of the participants 480 into text. The text generation module 402 may use one or more known speech-to-text techniques for converting audio signals of the speeches into text. The audio signals may be received from remote participants via a network such as the Internet (not shown) or from one or more microphones (not shown) used by local participants to participate in the meeting.

The text receiving module 404 receives the speeches of the participants in text. The text of the speeches may be received from remote devices (i.e., stationary and mobile computers such as desktops, mobile computers, and smartphones, etc.) that the participants use to participate in the meeting. These devices may convert the audio signals of the speeches into the text before sending the text to the system 400 or provide textual communication tools (e.g., side-chats, instant messaging, emails, tweets, TTY phone calls, faxes, social media content, etc.) for the participants to use to participate in the meeting.

The graph constructing module 406 receives the text of the participants' speeches from the text generation module 402 and/or the text receiving module 404. The graph constructing module 406 then builds a graph from the received text for each meeting participant. In some embodiments, the graph constructing module 406 builds one graph that includes words of the all participants' speeches. Alternatively or conjunctively, the graph constructing module 406 builds one graph for each participant that includes only the words of the participant's speech.

More specifically, in some embodiments, the graph constructing module 406 extracts syntactic features from the received text and converts the extracted features to vectors. These syntactic vectors can have binary components for the syntactic categories such as verb, noun, pronoun, adjective, lexical root, etc. For instance, a vector [0,1,0,0. . . ] represents a noun-word in some embodiments.

The graph constructing module 406 may also generate semantic vectors from the received text using one or more known techniques (e.g., Latent Semantic Analysis and WordNet). The semantic content of each word in the text may be represented by a vector, of which the components are determined by Singular Value Decomposition of word co-occurrence frequencies over a large database of documents.

In some embodiments, the graph constructing module 406 may also use previously generated or received text (e.g., transcripts from previous meetings) to generate the graphs. In these embodiments, the graph constructing module 406 may apply smaller weighting factors to the text generated prior to the current meeting. The graph constructing module 406 applies smaller weights to text from older meetings.

Figure 5:
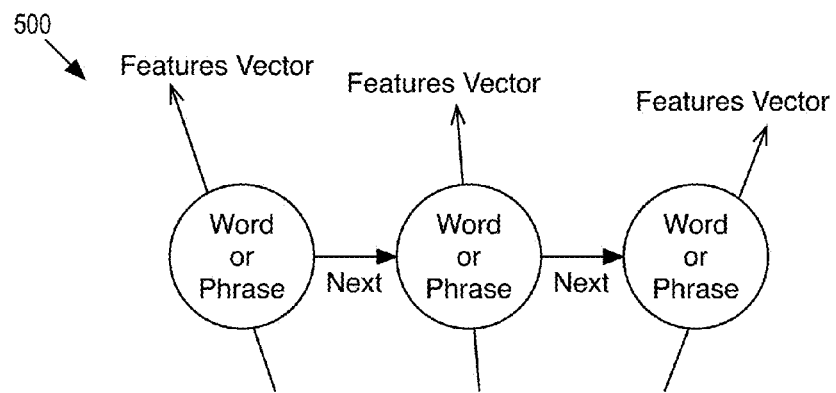
FIG. 5 depicts a graph of words according to an embodiment of the invention.

A graph generated for a meeting participant by the graph constructing module 406 may be in the form of: G={N, E, W̌}, where the nodes N represent tokens (e.g., words or phrases), the edges E represent temporal precedence in the participant' speech, and each node possesses a feature vector W̌ defined in some embodiments as a direct sum of the syntactic and semantic vectors and additional non-textual feature vector (e.g., a predetermined vector for the identity of the participant). That is, in some embodiments, the feature vector W̌ is defined by the equation: $W̌ = w̌_{sym} \oplus w̌_{sem} \oplus w̌_{ntxt}$, where W̌ is the feature vector, $w̌_{sym}$ is the syntactic vector, $w̌_{sem}$ is the semantic vector, and $w̌_{ntxt}$ is the non-textual features. An example graph 500 that may be generated by the graph constructing module 406 is shown in FIG. 5. As shown, the graph 500 is a directed graph that includes an ordered set of words or phrases, each with a feature vector. Loops may form in this graph if the same words or phrases are spoken more than once.

Referring back to FIG. 4, the graph constructing module 406 updates the graph as more text from the meeting participant is received from the text generation module 402 and/or the text receiving module 404 during the meeting. The graph constructing module 406 stores the generated graphs for the participants in the graphs repository 422.

The graphical text analyzing module 412 uses one or more machine learning tools and techniques known in the art to extract topological features from the graph and makes inferences about the cognitive state of each participant. The graphical text analyzing module 412 performs a graphical text analysis on the graph for each meeting participant generated by the graph constructing module 406. As a specific example of graphical text analysis, in some embodiments, the graphical text analyzing module 412 analyzes the graph G for the participant generated by the graph construction module 408 based on a variety of features. The variety of features include known graph-theoretical topological measures of the graph skeleton (i.e., a graph without features vectors: $G_{sk}$={N, E}) such as degree distribution, density of small-size motifs, clustering, centrality, etc. Similarly, additional values may be extracted by including the features vectors for each node of the graph. One such instance is the magnetization of the generalized Potts model (e.g., $H = \Sigma_n E_{nm} W̌_n T W̌_m$) such that temporal proximity (e.g., number of edges between two nodes) and feature similarity are taken into account. These features, which incorporate the syntactic, semantic and dynamical components of the speech, are then combined as a multi-dimensional features vector F̌ that represents a speech sample. This feature vector is finally used to train a standard classifier: $M = M(F̌_{train}, C_{train})$, to discriminate speech samples that belong to different conditions C, such that for each text speech sample the classifier estimates its condition identity based on the extracted features: C (sample)=$M(F̌_{sample})$.

In some embodiments, the graphical text analyzing module 412 compares the graph with the clusters of previously generated graphs stored in the clusters repository 420. More specifically, the feature vectors of previously generated graphs with known cognitive states are plotted in a multi-dimensional text feature space to form clusters in that space. The graphical text analyzing module 412 plots the feature vectors of the graph for the participant in the space in order to determine whether the graph belongs to a cluster based on, e.g., distance between the plots of the graph and the plots of the clusters. If the plots of the graph fall in the feature space of a particular cluster, the corresponding cognitive state represented by the cluster is determined as the cognitive state of the participant.

The graphical text analyzing module 412 stores the identified cognitive state of the participant in the cognitive states repository 424. The graphical text analyzing module 412 determines like-mindedness among meeting participants based on the identified cognitive states. In some embodiments, the cognitive states repository 424 stores a history of cognitive states for each meeting participant.

The meeting partitioning module 410 partitions the group of participants in the meeting into a plurality of subgroups that each include one or more participants. Specifically, in some embodiments, the meeting partitioning module 410 partitions the group into all possible numbers of subgroups—e.g., into two subgroups, three subgroups, and up to M subgroups, where M is the number of the meeting participants. The numbers of participants in the subgroups do not have to match—different subgroups may include different number of participants.

The different subgroups may have different relationship with each other. For instance, one subgroup may include teachers and other subgroup(s) may include students. Also, one of the subgroups may be a group of meeting facilitators or helpers and other subgroups may be participants of two sides of a debate.

The participants within a subgroup may also have different relationships with each other. The meeting participant may also be an individual teamed with a helper artificial agent with natural language processing capabilities so that a subgroup including the helper artificial agent and a participant form a composite participant. A participant may also be an artificial agent that acts on behalf of a human participant. Thus, in this case, the analysis is being performed on linguistic output of an artificial agent who may participate in a meeting or help a human participant. In some embodiments, the meeting partitioning module 410 may use known techniques to identify the participants and associate the participant identity with a speech.

Figure 6:
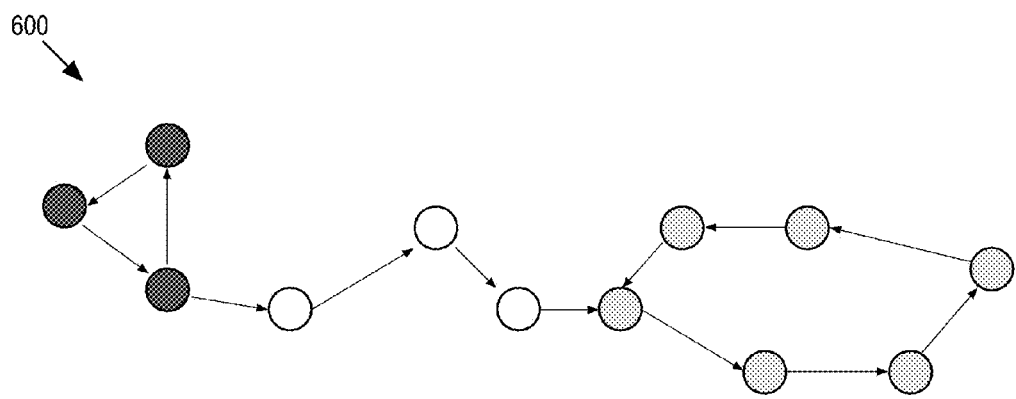
FIG. 6 depicts a graph of words according to an embodiment of the invention.

The meeting partitioning module 410 also generates a composite graph for each of the subgroups of participants by merging the graphs for individual participants in the subgroup or by partitioning the graph for all participants into a plurality of subgroups that each corresponds to a subgroup of participants. In some embodiments, each node of a composite graph generated for a subgroup of participants indicates who is the speaker of the words or phrases of the node. The order of the conversation may be captured and preserved in the composite graphs. The meeting partitioning module 410 stores the composite graphs for the subgroups in the graphs repository 426. FIG. 6 illustrates an example graph 600 for a subgroup of three participants. As described above, the nodes for different participants may include information about the identities of the participants. Specifically, the nodes for a participant are depicted in black, the nodes for another participant are depicted in white, and the nodes for yet another participant are depicted in grey.

Referring back to FIG. 4, the graphical text analyzing module 412 performs the same graphical text analysis on each composite graph to identify a cognitive state of the participants in the subgroup. Each subgroup of participants therefore represents a super-organism, a hive mind, or a composite person that is reflective of more than one participant. In some cases, a super-organism may take the form of a meeting participant (e.g., a student) and a meeting leader dyad (e.g., a teacher), for which the participant and the leader are analyzed as one unit. Based on such an analysis of the super-organism dyad, the graphical text analyzing module 412 may make additional inferences. The example graph 600 illustrated in FIG. 6 may also represent three subgroups of participants or three composite persons in some embodiments. That is, the nodes for one composite person are depicted in black, the nodes for another composite person are depicted in white, and the nodes for yet another composite person are depicted in grey. In these embodiments, each node of the graph may also include information about identities of the composite persons in addition to or alternative to the individual identifies of the participants.

In some embodiments, the graphical text analyzing module 412 may give different weights to different participants in a subgroup. For instance, a primary person on a teleconference (e.g., a meeting leader or simply any person in the meeting) may receive a bigger weight than his or her colleagues in the meeting. The weights may depend on various factors such as a person's position in a company, a measure of network connectivity in a social network, etc. These factors may be retrieved from the external information repository 425.

The transition detecting module 414 monitors the cognitive states of the individual participants or the subgroups of the participants to detect a transition from one cognitive state to another as the meeting progresses. In some embodiments, the transition detecting module 414 may also predict the cognitive state by building statistical models to identify likely transitions of cognitive states, indicating how individual participants are participating in the meeting in real time. For instance, the transition detecting module 414 may build a Markov model with probabilities of a transition and uses the model to characterize the transition based on the topologies of the graphs or composite graphs.

The advising module 416 automatically generates an advice to present to the individual participants or the subgroups of the participants based on the cognitive states or transition detected or predicted by the transition detecting module 414 in order to influence the course of meeting. The advising module 416 may alert each participant or subgroup about the cognitive state (e.g., detect growing levels of irritability/anger and issue an alert) and suggest corrective actions to improve the course of the conversation. The advising module 416 may also determine that the meeting is being diverged based on the cognitive state transitions for different participants or subgroups. Thus, the functioning of the system 400, a computing device, may be improved.

The advising module 416 generates an advice indicating the divergence and presents to the participants or the subgroups so that the participants may recognize the divergence and take the advice to adjust the course of the meeting. For instance, in a learning environment, when the transitions of the cognitive states for the students indicate that the students do not understand the lessons being provided by the teacher, advice may be generated and presented to the teacher so that the teacher recognizes the effectiveness of the teacher's communication and adjusts the teaching. The advice may be individually presented to the students whose cognitive states diverge.

The advising module 416 generates an advice based on the external information stored in the external information repository 424. For instance, the digital lesson plans for the teacher are compared against cognitive state transition models to establish correlations between lessons and cognitive state changes. The advice may also relate to guidance on how a person or team may present information in terms of such aspects as speed of presentation, vocal characteristics, word use, emotionality, etc. In some embodiments, the advising module 416 uses individual cast in a secure voting and this voting may be used in generating a proper advice, feedback, warning to the participant.

In some embodiments, the advising may be done via messages conveyed on a head-mounted display (e.g., Google Glass), screens, earpieces, reports to participants, reports to others (e.g., meeting facilitators), etc. In some embodiments, an artificial agent with natural language processing capabilities (e.g., IBM's DeepQA system) may be used to present the advice. A real or virtual agent may be represented as an avatar in a virtual world, and the decision to switch to, or make use of, a virtual world setting may be depended on the analyses performed.

The advising module 416 may suggest helper teachers or alternative teachers. The alternative teacher may be any of a human, a team of humans, a question and answer (Q&A) artificial agent (e.g., IBM's DeepQA system) with useful natural language processing abilities, etc. In some sense, the advising module 416 widens the applicability of (and serve as a "front end" to) a Q&A artificial agent. For example, the advising module 416 enhances such Q&A responses, so that the information or answers provided by the Q&A artificial agent have higher value. If the alternative teacher (or helper teacher) is a Q&A artificial agent, information may be emotively conveyed to a user as useful. For example, the responses may be transformed into data that additionally represents a simulated emotional state and potentially transmitted using an avatar in a virtual world. Data representing an avatar that expresses the simulated emotional state may be generated and displayed.

For such Q&A artificial agents, the external information processing module 418 enhances the interpretation of natural language utterances. The external information processing module 418 may be distributed over a client and server architecture (i.e., the client being participant devices), so that the scope of emotion recognition processing tasks may be allocated on a dynamic basis based on processing resources, communication channel conditions, loads on the client, etc. In some cases, partially processed prosodic data may be sent separately or combined with other speech data from the client device and streamed to the advising module 416 via the external information processing module 418 for a real-time response. In some embodiments, the external information processing module 418 is trained with real world expected responses to improve emotion modeling and the real time identification of potential features such as emphasis, intent, attitude and semantic meaning in the participant's utterances.

The external information processing module 418 also gathers and processes non-textual information to facilitate the identification of the cognitive states for the individual participants or the subgroups of the participants. For instance, the external information processing module 418 receives biometric information or physiological measurements (e.g., heart rate variability, blood pressure, galvanic skin conductance, electroencephalography, facial expressions, etc.) from the participants. The external information processing module 418 analyzes the biometric information to better identify the cognitive state or boost the confidence in the prediction of a transition from one cognitive state to another when the model built by the transition detecting module 414 shows that a transition is predicted with a confidence level or a likelihood that is smaller than a threshold.

In some embodiments, the advising module 416 automatically performs other confidence enhancing actions based on the external information stored in the external information repository 424. In some cases, the cognitive state of a student (e.g., someone seeking help of a teacher) is identified with a confidence level or a likelihood. When the value of confidence level is below a threshold, the advising module 416 does not initiate a change in teacher (or getting help from an extra teacher) or change in the lesson plans. However, if the value of confidence level is greater than the threshold, the advising module 416 automatically initiates a change in teacher (or obtains a helper teacher) or change in the lesson plans.

If the confidence level is less than the threshold, the advising module 416 automatically performs a confidence increasing action based on the external information stored in the external information repository 424, such as an analysis of other student in a student's social network (e.g., people close to the student), an analysis of prior fragments of text and/or speech of the student (e.g., a person seeking help), an analysis of a prior fragments of text and/or speech of individuals in the student's social network, etc. that are gathered and processed by the external information processing module 418. The advising module 416 assigns various weights to the prior fragment. For example, the further into the past a fragment occurs, the lower the weights of such fragments the advising module 416 assigns.

The advising module 416 automatically performs other confidence increasing actions if the confidence level is smaller than the threshold. The advising module 416 may use more public information obtained about a student, for example, posts made in a social media account (e.g., Facebook), various public communications, an analysis of past help queries, demographic information associated with the student, etc. gathered from the external information sources 482 and processed by the external information processing module 418. The use of such information may be approved in an opt-in fashion so that a student gives permission to perform such analyses if he or she wishes to receive better help. Another confidence increasing action that the advising module 416 may perform is to query the student regarding whether it is estimating the client's psychological state appropriately or correctly. For example, if the teacher is an artificial Q&A agent, it may ask the student if he or she is confused or angry, in order to increase the value of confidence level.

The external information processing module 418 also monitors and captures real-time participant events and stimuli in a learning environment. The participant events include classroom and collaboration-oriented input. The external information repository 418 stores a-priori skills of a typical student and a-priori knowledge of a participating student. In some embodiments, the external information processing module 418 receives and stores a set of cognitive model profiles in the external information repository 424 representing typical student behaviors and participant student behaviors with access to the captured participant events, the stimuli and the a-priori knowledge and skills. The advising module 416 uses such additional information.

The external information processing module 418 may be configured to be responsive to the participant events and stimuli to perform interactive tasks during a class session. The interactive tasks may include posing a question, supplementing a lecture, tracking progress and rating teacher performance. The external information processing module 418 also stores many questions based on various teaching parameters in the external information repository 424 and creates and displays a feedback form which is filled by the students. Each of the questions in the feedback form is assigned a pre-determined weight and pertains to at least one teaching parameter. This weight enables the system to compute a score for teachers teaching parameter-wise, department-wise or educational institution-wise, and these teachers may be Q&A agents. Such reports may be used by the advising module 416 in conjunction with the graphical text analysis described above. The students may be composite students or dyads described above.

As used herein, the terms module and sub-module may refer to an application specific integrated circuit, an electronic circuit, a processor (shared, dedicated, or group) and memory that executes one or more software or firmware programs, or a combinational logic circuit in a server. For example, in some embodiments, the text generation module 402 may be communicatively connected (e.g., through a bus 456) to a memory 452 to store and retrieve the audio signals and the text converted from the audio signals, and to a network interface 454 to communicate with the devices that the participants 480 use to participate in the meeting. The external information processing module 418 also uses the network interface 454 to communicate with the external information sources 482 and the participants 480. The graph constructing module 406 may use a processor 458 to construct graphs from the text. The graphical text analyzing module 412 may also use the processor 458 to perform a graphical text analysis on the graphs. Moreover, the repositories 420, 422, 424 and 426 may be implemented in the memory 452. In some embodiments, the modules of the system 400, namely the text generation module 402, the text receiving module 404, the graph constructing module 406, the meeting partitioning module 410, the graphical text analyzing module 412, the transition detecting module 414, the advising module 416, the external information processing module 418 may be combined or further partitioned. The modules of the system 400 may be implemented in more than one physical machine in a distributed fashion.

Figure 7:
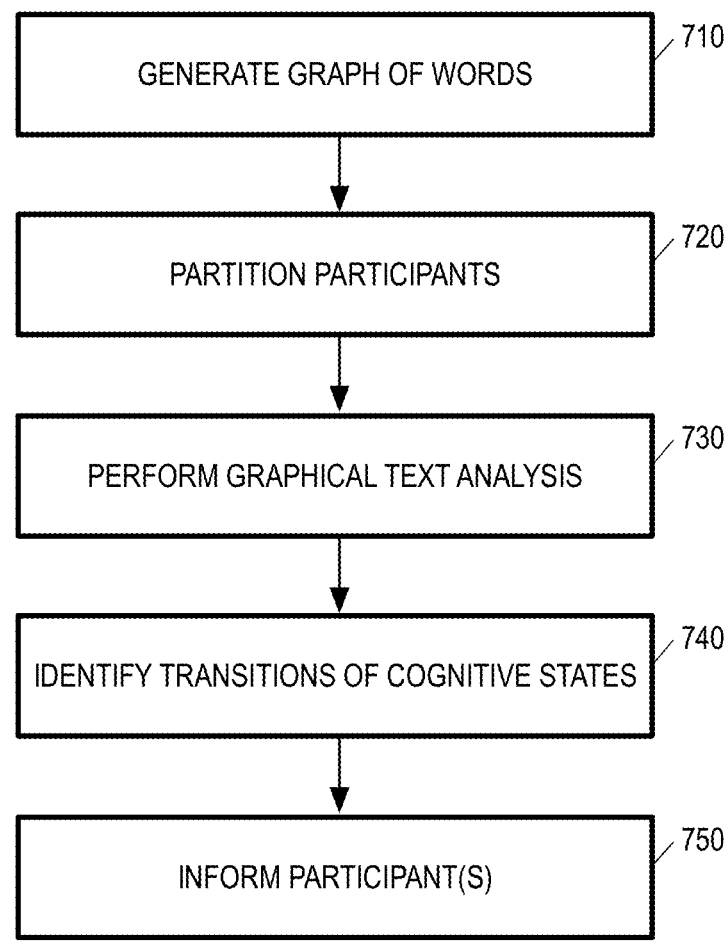
FIG. 7 depicts a process flow for facilitating a meeting according to an embodiment of the invention.

FIG. 7 illustrates a process flow for facilitating a meeting of a group of participants. In some embodiments, the system 400 performs the process flow shown in FIG. 7. At block 710, the system 400 generates a graph of words from the participants' speeches as the words are received from the participants. Specifically, the system 400 receives speeches from each participant in text or in audio. The system 400 converts any speech in audio into text in real time. The system 400 captures an order in which the words are received from the participants in the graph.

At block 720, the system 400 partitions the group of participants of the meeting into a plurality of subgroups of participants. For instance, one subgroup includes a teacher and another subgroup includes the students learning from the teacher in the meeting when the meeting takes place in a learning environment.

At block 730, the system 400 performs a graphical text analysis on the graph to identify a cognitive state for each participant and a cognitive state for each subgroup of participants. In some embodiments, the system 400 also partitions the graph into a plurality of subgraphs that each correspond to a subgroup of participants. The system 400 performs the graphical text analysis on each subgraph.

At block 740, the system 400 identifies any transition from one cognitive state to another for each participant and each subgroup of participants in order to detect any divergence of the cognitive states by the participant or the subgroup during the meeting. In some embodiments, the system 400 determines whether a likelihood of the transition is below or above a threshold. In response to determining that the likelihood of the transition is below the threshold, the system 400 automatically gathers additional information other than the text received or converted at block 710 to increase the likelihood of the transition using the gathered information. This additional information includes at least one of biometric information of a participant, social network content of a participant, and speeches made by a participant in a prior meeting.

At block 750, the system 400 informs at least one of the participants of the meeting about the identified cognitive state of a participant or a subgroup of participants. In some embodiments, the system 400 automatically generates an advice based on the divergence detected at block 740. The system 400 provides the advice to at least one of the participants. In some embodiments, the advice is provided in response to determining at block 740 that the likelihood of the transition is above the threshold. The advice includes a suggestion to change a course of the meeting. For instance, the advice may include a suggestion for a change in lesson plans of the teacher based on the transitions in cognitive state of the students when the meeting takes place in a learning environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for facilitating a meeting of a group of participants, the method comprising:
    receiving, by a processor, via a network, words uttered by the participants during the meeting, wherein the words are received as electronic text;
    generating, by the processor, a data structure that represents a graph of words from the participants as the words are received from the participants, wherein the graph includes a plurality of nodes and a plurality of edges, each node representing a word or a phrase uttered by a participant and an identity of the participant, and each edge representing a temporal precedence of utterance of the words;
    performing, by the processor, a graphical text analysis on the graph of words to determine cognitive states of the participants respectively;
    partitioning the group of participants into a plurality of subgroups of participants;
    determining, by the processor, a combined cognitive state of a subgroup of participants by:
        retrieving, from an information repository, weights associated with respective participants of the subgroup of participants, wherein a weight assigned to each respective participant is based on prior social network posts of the each respective participant that are automatically retrieved and analyzed from an external information repository; and combining the cognitive states of the participants of the subgroup according to the corresponding weights of the participants of the subgroup; and informing at least one of the participants of the meeting about the combined cognitive state of the subgroup of participants, wherein the informing comprises displaying the combined cognitive state on an electronic display.

2. The method of claim 1, further comprising:

identifying any transition from one cognitive state to another for each participant and each subgroup of participants in order to detect any divergence of the cognitive states by the participant or the subgroup during the meeting;

automatically generating an advice based on the detected divergence; and providing the advice to at least one of the participants in order to influence a course of the meeting.

3. The method of claim 2, further comprising, in response to determining that a likelihood of the transition is below a threshold, automatically gathering information other than the text to increase the likelihood of the transition using the gathered information, wherein the advice is provided in response to determining that the likelihood of the transition is above the threshold, wherein the advice is provided as a service in a cloud environment.

4. The method of claim 3, wherein the information other than the text includes a biometric information of a participant, and speeches made by a participant in a prior meeting.

5. The method of claim 2, wherein performing the graphical text analysis on the graph comprises analyzing speeches of one subgroup of participants as speeches of one composite person.

6. The method of claim 1, wherein performing the graphical text analysis comprises:

partitioning the graph into a plurality of subgraphs that each correspond to a subgroup of participants; and performing the graphical text analysis on each subgraph.

7. The method of claim 1, wherein generating the graph comprises:

receiving the words from each participant in digital text or in digital audio;

converting the digital audio into text in real time using a speech-to-text converter;

and capturing, in the graph, an order in which the words are received from the participants.

8. The method of claim 1, further comprising:

determining a confidence level of the cognitive state of the subgroup; and in response to the confidence level of the combined cognitive state being below a predetermined threshold, automatically gathering information of the participants of the subgroup to increase the confidence level, wherein the information gathered includes content from a social network.

9. The method of claim 1, wherein the weight assigned to each respective participant is based on a position of the participant in a company.

10. The method of claim 1, wherein the weight assigned to each respective participant is based on a measure of social network connectivity of each respective participant.

* * * * *